(12) United States Patent  (10) Patent No.: US 6,390,223 B1
Savage et al.  (45) Date of Patent: May 21, 2002

(54) ENGINE/TRANSMISSION COMBINATION MOUNTING SYSTEM

(75) Inventors: James C Savage, Lake Orion; Robert P Uhlig, Rochester Hills; Stephen M Leitner, Oxford; Brian D. Dwyer, Royal Oak, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/483,129

(22) Filed: Jan. 14, 2000

(51) Int. Cl.$^7$ .................................................. B60K 5/12
(52) U.S. Cl. ........................ 180/300; 180/297; 180/312; 248/605; 248/603; 248/593
(58) Field of Search ................................. 180/297, 300, 180/299, 292, 312, 293, 291; 248/605, 603, 560, 638, 580, 592, 593, 607

(56) References Cited

U.S. PATENT DOCUMENTS

| | | | |
|---|---|---|---|
| 2,084,080 A | 6/1937 | D'Aubarede | 180/64 |
| 2,106,541 A | 1/1938 | Tjaarda | 180/54 |
| 3,402,782 A | 9/1968 | Ljungström | 180/64 |
| 3,825,090 A | 7/1974 | Runkle et al. | 180/64 R |
| 4,240,517 A | 12/1980 | Harlow, Jr. et al. | 180/295 |
| 4,440,257 A | 4/1984 | Danckert | 180/300 |
| 4,667,764 A | 5/1987 | Sawada et al. | 180/297 |
| 4,779,834 A * | 10/1988 | Bittner | 180/300 X |
| 4,901,814 A | 2/1990 | Von Broock et al. | 180/297 |
| 5,129,479 A * | 7/1992 | Fujii et al. | 180/300 X |
| 5,133,427 A * | 7/1992 | Arvidsson et al. | 180/297 |
| 5,205,374 A | 4/1993 | Love et al. | 180/300 |
| 5,267,630 A * | 12/1993 | Watanabe et al. | 180/297 |
| 5,967,251 A * | 10/1999 | Turl et al. | 180/300 X |
| 6,155,372 A * | 12/2000 | Hirasaka | 180/297 |

* cited by examiner

Primary Examiner—Frank Vanaman
Assistant Examiner—F. Zeender
(74) Attorney, Agent, or Firm—Edwin W. Bacon, Jr.

(57) ABSTRACT

A mounting arrangement for an engine/transmission combination in a front wheel drive vehicle including a bearing support at either end of the engine/transmission and a pair of elongated torque struts between the vehicle structure and the engine/transmission. The two torque struts extend substantially parallel to one another and are positioned substantially in a vertically extending plane. The torque struts restrain torsionally induced rolling movements of the engine/transmission.

7 Claims, 1 Drawing Sheet

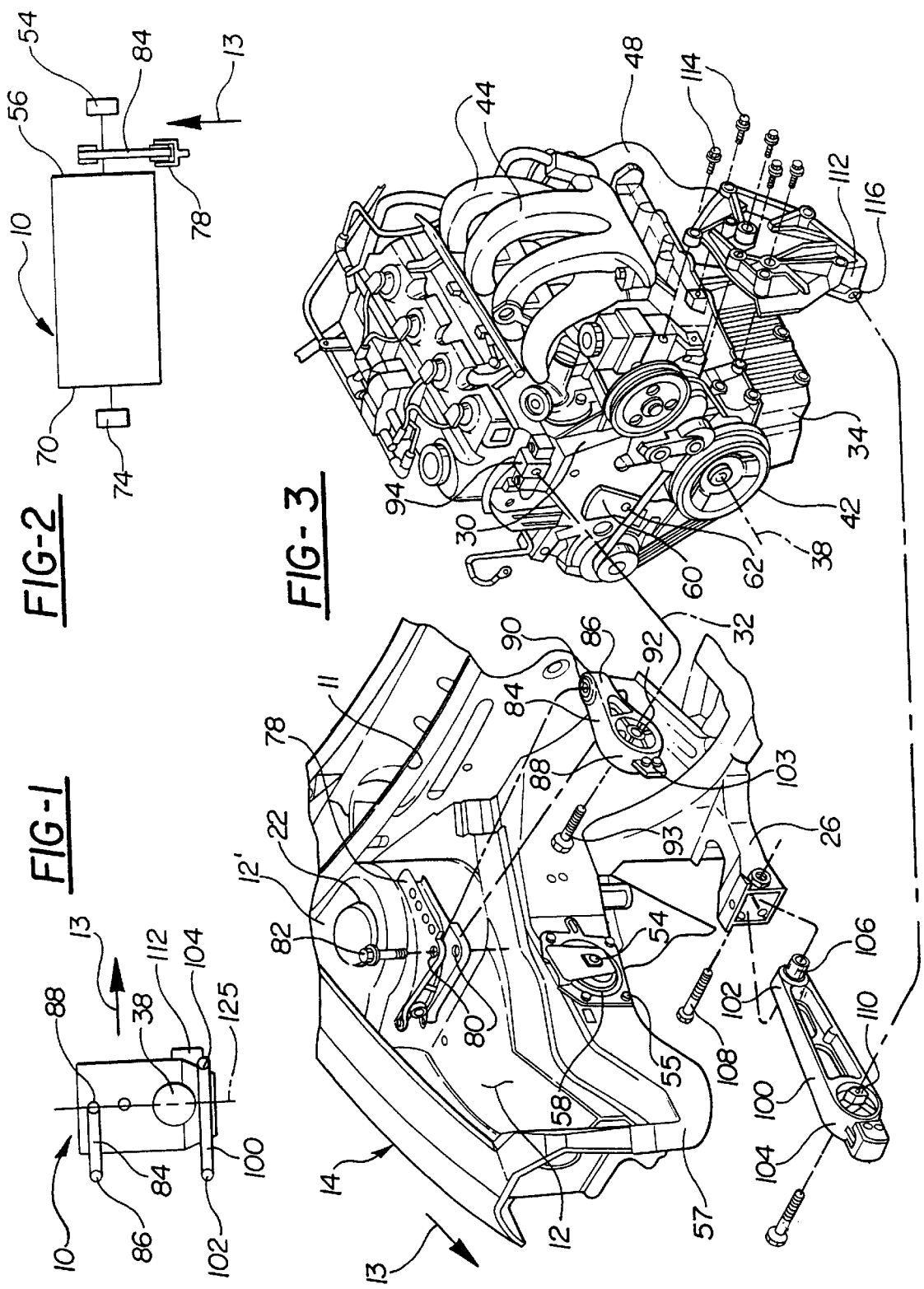

ENGINE/TRANSMISSION COMBINATION MOUNTING SYSTEM

FIELD OF THE PRESENT INVENTION

This invention relates to mounting a combination engine/transmission in a front wheel drive vehicle and more particularly to supporting a transversely mounted engine/transmission with an arrangement to counter rotation of the engine/transmission in it mounts.

DESCRIPTION OF PRIOR ART

In recent times, there has been a major effort to increase fuel economy of automotive vehicles and there have been several technical trends developed to achieve increased fuel economy. One such trend is an increase in front-wheel-drive vehicles where the weight of the engine is placed over the traction wheels of the vehicle. Another trend to increase fuel economy is to provide smaller V-6 or straight line four-cylinder engines instead of the previously utilized V-8 engine. Still another trend is to make the vehicle smaller and lighter-weight. The comfort of the vehicle's occupants is very important in the effort to encourage car buyers to consider smaller and lighter vehicles. It is clear to those skilled in the art of vehicle engineering design that a major factor for maximizing occupant comfort is to minimize vibrations and noise, particularly those associated with the engine and transmission.

In front-wheel-drive vehicles, it is common engine and transmission mount practice to design the mounts to handle a torque reaction of the powertrain as well as supporting the assembly. The torque reaction comes from the action of the engine/transmission in the mounting arrangement and from the action of the entire powertrain at the differential or at the torque output to the driving wheels. It has been common practice to design the mounts to handle the torque reaction of both the engine/transmission and the differential (or powertrain output). Where the engine/transmission are mounted longitudinally in the vehicle (as opposed to being mounted transversely), the engine/transmission's torque reaction is in the vehicle's overall roll direction as defined as a moment about a generally longitudinal axis relative to the vehicle. On the other hand, the differential related torque reaction is in the vehicle's pitch direction as defined as a moment about a generally lateral axis relative to the vehicle. As a result, the two torque reaction effects are not additive and thus it is not difficult for the engine/transmission mounts to handle both torque reactions utilizing the spring rate of the engine/transmission cushion mounts.

When an engine/transmission of a vehicle is mounted transversely, the torque reaction of the engine/transmission is in the vehicle's pitch direction (moment about a laterally extending axis). The torque reaction of the differential is also in the vehicle's pitch direction. Thus, both torque reactions are additive and are directly coupled together acting upon the engine mounting arrangement. This effect imposes a very significant burden on the mounting arrangement since the resultant cumulative loads in the pitch direction includes both the engine/transmission's normal torque reaction and the differential's torque reaction which is effected by the effective transmission ratio and the axle ratio.

According to conventional practice and irrespective of the relative position of the engine and transmission in the vehicle, it is desirable for deriving a maximum benefit in isolating the vibration of the sprung mass including the powertrain and differential that the engine/transmission mounts be located adjacent to the points of minimum vibratory force in the powertrain system, i.e. node points. However, where a compact vehicle utilizes a transversely mounted engine of the type exhibiting relatively great vibration characteristics, e.g. an in-line four-cylinder, typically there is very little space available for conventional cushion mounting arrangements sized to effectively control pronounced powertrain vibrations as well as vertical motion or shake and any pitching motion.

The concerns identified above have been previously addressed and the combination engine/transmission mounting system disclosed in U.S. Pat. No. 4,901,814 to VonBroock, et al is known. VonBroock provides two engine mounts supporting an engine/transmission along three axes. The engine/transmission's torque reaction is resisted by two torque struts. In a preferred embodiment, one of the engine mounts is close to the center of gravity of the engine/transmission combination. A second engine mount is placed near an end of the engine of the engine/transmission combination. A support bracket in the form of a crescent shape extends in a fore and aft direction of the vehicle within the engine compartment. The bracket is positioned near the center of gravity of the engine/transmission combination. As explained in VanBroock, the torque struts are positioned close to the center of gravity of the engine/transmission combination.

The VanBroock engine/transmission mounting arrangement has several disadvantages. The first disadvantage is the need for a support bracket to be installed within the engine compartment where room is sparse. This is very undesirable especially in small compact vehicles. Secondly, the addition of the support bracket requires that the vehicle fire wall which separates the engine compartment from the passenger compartment be reinforced to allow for attachment of the support bracket. Thirdly, the support bracket transmits vibrations of the engine/transmission to the passenger compartment in close proximity to the steering column of the vehicle. This is highly disadvantageous since this causes the vibrations to be amplified to the hands of the vehicle driver.

It is desirable to provide a mounting arrangement for an engine/transmission combination suitable for a front-wheel-drive vehicle and which minimizes the generation of undesired vibration. It is desirable to provide an engine/transmission combination mounting arrangement which is simple and inexpensive.

SUMMARY OF THE INVENTION

The present invention concerns a combination engine and transmission mounting arrangement suitable for a vehicle with front wheel drive and a transversely mounted engine. The mounting arrangement provides a first bearing support which translationally and fixably supports the weight of a first end portion of the engine/transmission combination. A second bearing support is provided for translationally and fixably supporting an opposite second end portion of the engine/transmission combination. A first torque strut is provided having a first end connected to a vehicle structural member adjacent to a rear corner of the engine compartment. The opposite second end of the torque strut is connected to the engine/transmission combination generally adjacent the first end of the portion of the engine/transmission combination. A second torque strut is provided which is in vertical alignment with the first torque strut. The second torque strut has a first end connected to a structural member of the vehicle adjacent the rear corner of the engine compartment. A second end of the second torque strut is connected to the engine/transmission combination adjacent to but lower than where the first torque strut's second end attaches to the engine/transmission.

It is an object of the present invention to provide a combination engine/transmission mounting arrangement for an engine in a front-wheel drive and transverse mount vehicle.

It is another object of the present invention to provide a combination engine/transmission mounting arrangement for an engine in a front-wheel drive and transverse mount vehicle which minimizes powertrain vibrations.

The above noted and other objects of the present invention will become apparent to those skilled in the art from a review of the invention as it is provided in the accompanying drawings and detailed description of the preferred embodiment.

BRIEF DESCRIPTION OF THE DRAWINGS

FIG. 1 is an end schematic view of a combination engine/transmission mounting arrangement for an engine in a front-wheel drive and transverse engine mount vehicle according to the present invention illustrating the location of one bearing support and first and second torque struts; and FIG. 2 is a top schematic view of a combination engine/transmission mounting arrangement as shown in FIG. 1 to illustrate the location of another bearing support; and FIG. 3 is an exploded perspective view of a vehicle engine compartment and the combination engine/transmission showing the first bearing support for one end of the engine/transmission and the two torque struts and an associated shock absorber tower support of the vehicle.

DESCRIPTION OF THE PREFERRED EMBODIMENT

Referring to the Figures, an engine/transmission mounting arrangement is shown for a vehicle with front-wheel drive and a transversely mounted engine. Specifically, the mounting arrangement 10 is provided within an engine compartment 12 of a vehicle 14. The engine compartment 12 has a rear end portion or firewall 11 and a passenger side corner 12'. An arrow 13 points in the forward direction or towards the front end of the vehicle. The passenger side corner 12' is transversely or laterally located opposite to a driver side corner which is not shown but typically that corner is adjacent the steering wheel and column. A structural body or chassis member called a shock (absorber) tower 22 is located adjacent the rearward part of the passenger side corner 12'. The shock tower 22 mounts the upper end of a shock or McPherson strut suspension component (not shown). A structural member called a K frame 26 is located at a lower portion of the passenger side corner 12'. The K frame 26 is attached to the vehicle's frame rails and torque box. At the opposite drivers side corner, an identical structure is present.

A combination engine/transmission 30 is provided to power the vehicle 14. Engine/transmission 30 has an engine block portion 32 with a lower portion covered by an oil pan or case 34. Engine 30 has a crankshaft (not shown) that rotates about a rotational axis 38 which extends transversely to the longitudinal axis of the vehicle 14 parallel to the arrow 13. The end of the crankshaft is attached to a sprocket or serpentine belt carrying wheel 42. As shown, the engine/transmission 30 has four cylinders inline serviced by a four branch exhaust manifold 44. A transmission 48 only partially shown in FIG. 3, is attached to a rearward and lower end portion of the engine block 32. The transmission 48 includes a differential portion and a transaxle arrangement (not shown but common in the vehicle art) which connects to front wheels (not shown) of the vehicle. The differential and output transaxle extend in an axis which is normal to the vehicle's longitudinal axis or the arrowed line 13. Thus, the differential and output transaxle axis extends laterally across the vehicle.

A first bearing support 54 for the combination engine/transmission is located in the engine compartment 10 adjacent shock tower 22. The support 54 fixably supports the weight of one end portion of the engine/transmission 10 (and the included differential) and attaches to the engine/transmission 10 generally adjacent the engine block's first end 56. The support 54 prevents lateral movements of the engine/transmission and also inhibits fore and aft or longitudinal translation of the end portion 56 of the engine. However, support 54 provides little if any resistance to torsional movements or engine rolling about the laterally extending roll axis (normal to the arrowed line 13). Ideally, the first bearing support 54 is positioned at or very near the engine's rotational center of reaction for the drive train assembly including engine 30, transmission 48, the differential, and the transaxles or final drive shafts. In practice, this location is typically not available due to other geometric constraints and assembly limitations.

In a preferred arrangement, the first bearing support 54 uses hydro-bushings 58 which include a sleeve of elastomeric material to dampen and isolate vibration. The engine block 32 has a surface raised platform 60 and a tapped aperture 62 to be connected to the bearing support 54 by an appropriate threaded fastener. The first bearing support 54 is connected by a plurality of bolts 55 to the right side rail 57 of the vehicle 14.

As revealed in FIG. 2, the opposite end portion 70 of the engine/transmission 10 is vertically supported by a second bearing support 74. In a similar manner to the other bearing support 54, the second bearing support 74 has an elastomeric sleeve construction to isolate the vehicle from vibrations of the motor/transmission 10. The second bearing support 74 also fixably supports the weight of the other end portion of the engine/transmission 10 (and included differential) in three directions but is not designed to inhibit rotation of the engine/transmission 10. The second bearing support 74 is connected at the left (or driver side) rail of the vehicle (not shown) at about the same height as the first bearing support 54. A bracket (not shown) extends vertically downward from the second bearing support 74 to a position generally adjacent to the second end portion of the engine/transmission 10. As mentioned previously, a line through the bearing mounts 54 and 74 is generally coincident with the axis of torque reaction of the drive train which includes both the contribution of the engine/transmission 10 and the powertrain output (or differential, transaxle, and drive shafts). The engine/transmission 10 is mounted within the vehicle 14 such that its rotational axis 38 extends substantially transversely of the vehicle and normal to the major or longitudinal axis of the vehicle which is parallel to line 13.

An "L" frame assembly 78 with two parallel and spaced arms is mounted to shock tower 22 as shown in FIG. 3. The arms of the frame assembly 78 have aligned bores 80 therethrough for a bolt 82. A first torque strut 84 has a first end 86 and a second end 88. The first end 86 carries an elastomeric isolating bushing 90 which is oriented for connection by bolt 82 to the L frame assembly 78 attached to the shock tower 22. The opposite second end 88 of the torque strut 84 carries an elastomeric isolating bushing 92 oriented generally parallel with the rotational axis 38 of engine/ transmission 10. The second end 88 is connected by a bolt 93 to a strut bracket 94 carried at an upper location on the engine. The first torque strut 84 torsionally restrains the engine/transmission 10 while the bushings 90 and 92 isolate engine vibrations from transmittal to the vehicle.

A second torque strut 100 extends parallel to the first torque strut 84 and is generally vertically aligned therewith. The second torque strut 100 has a first end 102 and a second end 104. The first end 102 carries an elastomeric isolating bushing 106 and is connected to the K frame 26 by bolt 108. The pivotal axis of the bushing 106 and bolt 108 is generally parallel with the rotational axis 38 of the engine/transmission. The strut's second end 104 carries an elastomeric isolating bushing 110 and is connected to the engine block 32 via a bracket 112 which is fastened to the side of the engine block 32 and/or oil pan 34 by a plurality of bolts 114 which thread into an aperture 116. Bracket 112 is also used to mount an air conditioning compressor (not shown) to the engine. Due to packaging restraints, the second torque strut 100 is longer than the first strut 84.

In operation, the first bearing support 54 and second bearing support 74 support the weight of the engine/transmission 10 in the vertical direction and also prevent movement in the fore and aft direction and in the lateral direction. Torsional forces which would cause rocking or roll of the engine/transmission are inhibited by the first and second torque struts 84 and 100. The isolation of the engine from the vehicle by the elastomeric bushings in the torque struts 84, 100 further inhibits transmission of vibrations to the shock tower 22 and K frame 26. The attachment of the torque struts to the shock tower 22 and K frame 26 on the passenger side of the vehicle rather than the driver's side further isolate vibrations from the steering wheel of the vehicle located remotely from the passenger side.

Ideally, the two torque struts 84 and 100 should extend tangentially to an arc which describes the torsional axis of reaction of the power train with the strut's second ends 88 and 104 respectively connected to the engine/transmission 10 along a vertical plane 125 which intersects the torsional axis of reaction of the engine/transmission, differential, transaxle, and half-shafts. However, due to packaging constraints on the engine as shown, the actual connection of the second strut's end 104 in extended forward from plane 125.

The ends 88, 104 of torque struts 84 and 100 have masses 103, 105 integrally connected thereto. Adding masses 103 and 105 tend to move the center of percussion of the torque struts generally coterminous with their bolted connections with the engine block 30. In further detail, bushing 106 of end 102 of the second torque strut 100 has a high dynamic rate to prevent rigid body torque strut resonance in the longitudinal direction of the second torque strut 100. The elastomeric bushing at the second end 104 of strut 100 has a lower dynamic rate isolator to provide isolation between the engine 30 and the K frame 18. Typically, the bushing 106 will have a dynamic rate that is approximately 9–15 times and preferably 10–12 times higher than the dynamic rate of the bushing 110.

What is claimed is:

1. A combination engine/transmission mounting arrangement for a front wheel drive vehicle with a transversely mounted engine, the vehicle having an engine compartment including structure which defines a rear corner and an adjacent rear end wall, said mounting arrangement comprising:

a first bearing support for supporting a first end portion of the engine/transmission, said first bearing support being located at or very near an axis of torque reaction of the combination engine/transmission;

a second bearing support for supporting a second end portion of the engine/transmission at a location generally opposite said first end portion and at or very near said axis of torque reaction of the combination engine/transmission;

a first torque strut having a first end connected to the structure of said vehicle adjacent the rear corner, said first torque strut having a second end connected to the combination engine/transmission at said first end of said engine/transmission for restraining torsional movements of the combination engine/transmission, a second torque strut having a first end connected to the structure of said vehicle adjacent a rear corner end of said engine compartment, said second torque strut having a second end connected with said combination engine/transmission at said first end of said engine/transmission, said second torque strut extending generally parallel to and aligned with said first torque strut, both being in the same vertically extending plane.

2. The combination engine/transmission mounting arrangement as described in claim 1, wherein one torque strut is longer than the second torque strut.

3. The combination engine/transmission mounting arrangement as described in claim 1, wherein said first and second ends of at least one of said torque struts is separated form one another by a vertical plane intersecting an axis of torsional reaction of said combination engine/transmission.

4. The combination engine/transmission mounting arrangement as described in claim 1, wherein said second torque strut has an elastomeric isolating bushing at said first end and at said second end, said elastomeric isolating bushing carried by said first end of said second torque strut is tuned to have a higher dynamic response rate than said elastomeric isolating bushing carried by said second end of said second torque strut.

5. The combination engine/transmission mounting arrangement as described in claim 4, wherein said elastomeric isolating bushing carried by said first end of said second torque strut has a dynamic rate ranging from about 9 to 15 times the dynamic rate of said elastomeric isolating bushing carried by said second end of said second torque strut.

6. The combination engine/transmission mounting arrangement as described in claim 1, wherein said first ends of said two torque struts are connected to said structure member on a side of said vehicle laterally opposite the drive's side of said vehicle with a steering wheel.

7. A combination engine/transmission mounting arrangement for a front wheel drive vehicle with a transversely mounted engine, the vehicle having an engine compartment partially defined by a shock tower and a K frame member both located adjacent a rear corner of said engine compartment, said mounting arrangement comprising:

a first bearing support for supporting a first end portion of the engine/transmission, said first bearing support being located at or very near an axis of torque reaction of the combination engine/transmission;

a second bearing support for supporting a second end portion of the engine/transmission at a location generally opposite said first end portion and at or very near said axis of torque reaction of the combination engine/transmission;

an elongated first torque strut having a first end connected to said shock tower and an opposite second end connected to the engine/transmission for restraining torsionally induced rolling movements of said engine/transmission, at least one of said ends of said first torque strut carries an elastomeric isolating bushing to inhibit transmission of vibrations from said engine/transmission to the vehicle; and an elongated second torque strut having a first end connected to said K frame member and an opposite second end connected to the engine/transmission, said second torque strut extending substantially parallel to said first torque strut and with the first and second torque struts being substantially aligned in a vertical plane, wherein said second torque strut restrains torsionally induced rolling movements of the engine/transmission, and wherein at least one of said ends of said second torque strut carries an elastomeric isolating bushing for inhibiting transmission of vibrations from said engine/transmission to the vehicle.

\* \* \* \* \*